Jan. 7, 1964     H. G. NEIL     3,116,629
APPARATUS FOR TESTING POROUS MATERIAL
Filed June 15, 1959     3 Sheets-Sheet 1

INVENTOR
HUGH G. NEIL
BY Swecker + Mathis
ATTORNEYS

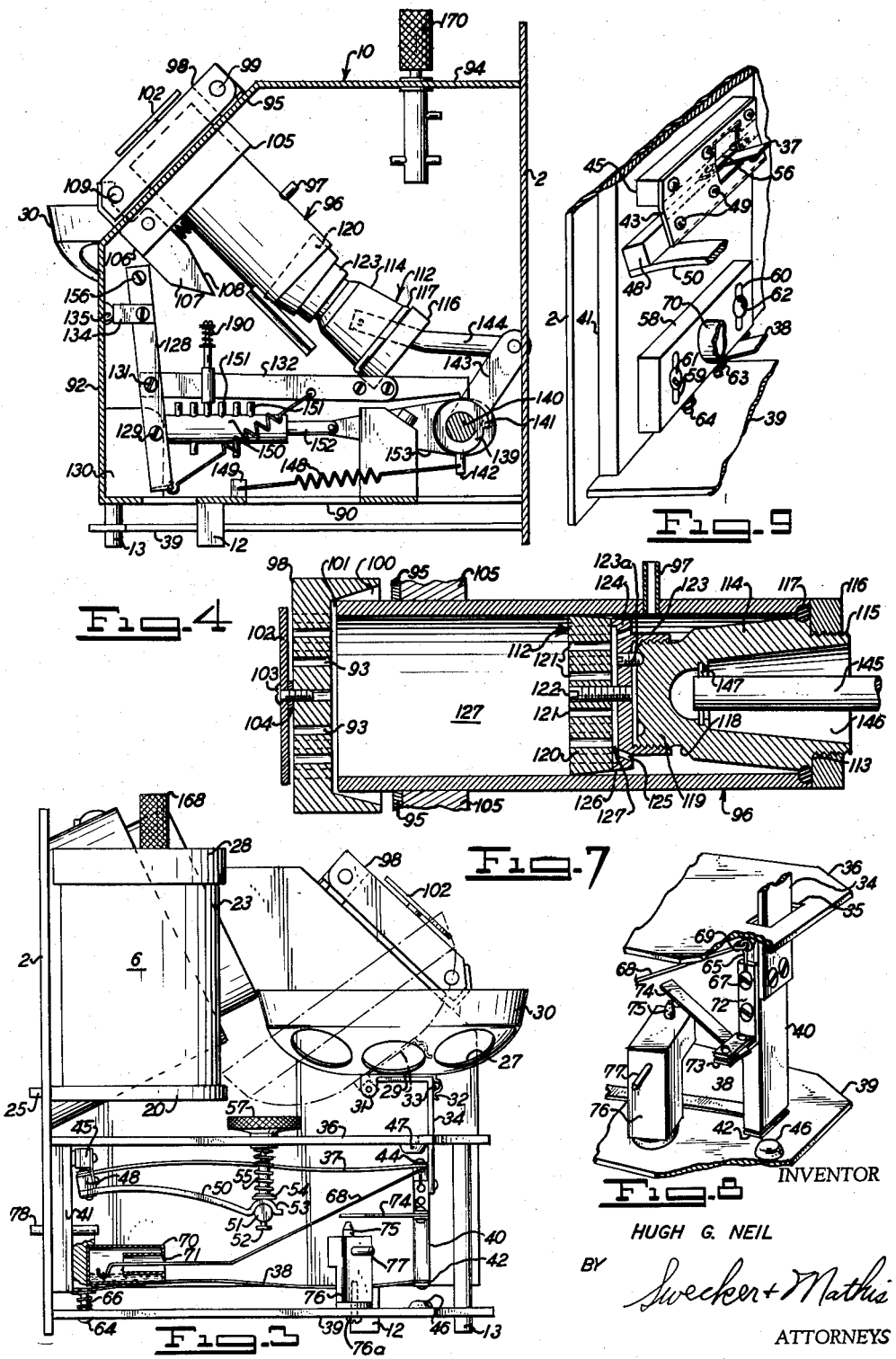

Jan. 7, 1964 H. G. NEIL 3,116,629
APPARATUS FOR TESTING POROUS MATERIAL
Filed June 15, 1959 3 Sheets-Sheet 3
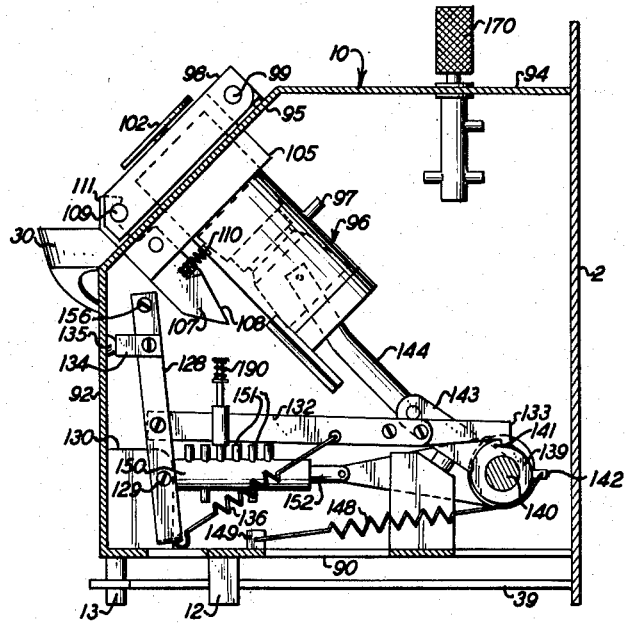
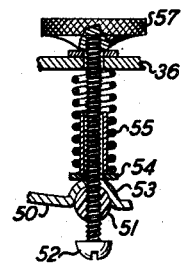
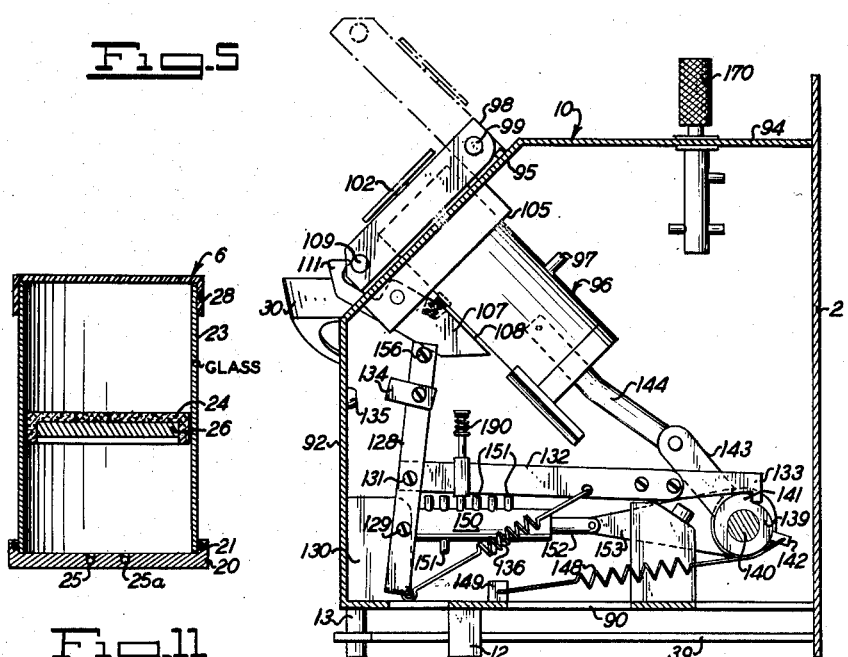
INVENTOR
HUGH G. NEIL
BY Swecker + Mathis
ATTORNEYS United States Patent Office 3,116,629
Patented Jan. 7, 1964

3,116,629
APPARATUS FOR TESTING POROUS MATERIAL
Hugh Gross Neil, Knoxville, Tenn., assignor, by mesne assignments, to The University of Tennessee Research Corporation, Knoxville, Tenn., a corporation of Tennessee
Filed June 15, 1959, Ser. No. 820,163
6 Claims. (Cl. 73—38)

This invention relates to apparatus for determining certain physical properties of porous materials, and more specifically, it concerns apparatus for measuring the degree of fineness of fibrous materials by means of air-flow measurements.

This application is a continuation-in-part of my copending application Serial No. 661,224, filed May 23, 1957, now Patent No. 3,065,629, issued Nov. 27, 1962.

As is well known to those in the textile trade, it is frequently desirable to determine the fineness of textile fibers, and particularly cotton fibers, with some degree of speed and accuracy. Such determinations may be required wherever cotton is grown, traded or processed, and frequently must be made under adverse conditions in the absence of either trained technicians or the laboratory facilities normally required for testing fiber samples under controlled conditions.

Accordingly, it is of primary importance that an easily operated, portable, field apparatus be provided for enabling relatively unskilled operators to determine fiber fineness wherever the need may arise. It will be appreciated in this connection that the practical requirements for a successful field instrument differ significantly from those applicable to a laboratory instrument. It is desirable that a field instrument be compact and light in weight, so that it may be moved easily from one location to another by the operator. Moreover, the field instrument must be so simple and so rugged that it may be used by relatively unskilled operators under widely varying environmental conditions to produce results of reasonable accuracy. In contrast, the laboratory instrument is ordinarily operated by trained technicians in a controlled environment.

Of particular interest in this general field is an instrument such as that disclosed in my copending application Serial No. 661,224, filed May 23, 1957. This instrument permits the determination of fiber fineness through the use of the known principle that, for equal weights of fibers confined in equal spaces, the finer fibers offer more resistance to the passage of air than do coarser fibers. This phenomenon forms the basis for air-flow fineness tests whether carried out in the laboratory or in the field.

It is a general object of this invention to provide improved air-flow measuring apparatus so constructed as to permit its use for the rapid, accurate determination of fiber fineness under field conditions.

Another object of the invention is to provide porosity measuring apparatus with means for accurately determining the weight of a sample to be tested, which means is so constructed that it may be operated under a variety of environmental conditions and that it will not detract from the portability of the apparatus.

Yet another object of the invention is to provide an improved fluid-operated weighing instrument with novel cantilever spring suspension means, together with novel means for calibrating and adjusting said spring means.

Still another object of the invention is to provide a fluid-operated measuring instrument with a sample test chamber having improved means for inserting and extracting the sample to be tested.

Still another object of the invention is to provide an improved fluid-operated measuring instrument having a number of alternately operable fluid conduits with novel means of check weighing fiber samples.

The foregoing objects are accomplished, according to one embodiment of the invention, by the provision of a combination of fluid conduits so arranged and connected together as to permit the determination of both the weight and the porosity of a given sample of porous material. Both of these determinations are made through the use of bridge-type fluid circuits which operate in a manner comparable to the well known Wheatstone bridge circuits employed in electrical metering equipment and the like.

The sample to be weighed is placed upon resilient means which includes a member capable of moving in a vertical direction in response to the weight of the sample. This movable member is mounted upon a novel spring system having improved means for adjustment and calibration. Movement of the member is detected by a fluid system having nozzle means disposed in proximity to the movable member so that the flow of fluid through the nozzle varies in accordance with the position of the movable member. Variations in the resistance to the fluid flow through the nozzle are detected by a fluid bridge system and indicated on a meter connected across intermediate points of the bridge.

The construction of the apparatus is such that portions of this air bridge system may also be employed in the determination of the porosity of the sample. A fluid switch disposed in the system is operable to disconnect the nozzle of the weighing mechanism and to connect two other conduits into the bridge system. One of these is adapted to contain the weighted sample and the other is provided with an adjustable needle valve having a substantial resistance to fluid flow. Hence, operation of the air switch conditions the apparatus for the making of a porosity determination.

A more complete understanding of the invention, and an awareness of still other objects and advantages of it, will be gained from a consideration of the following detailed description of an embodiment illustrated in the accompanying drawings, in which:

FIG. 3 is a side elevational view as seen from the left of FIG. 1;

FIG. 4 is a partial vertical cross sectional view taken along the line 4—4 in FIG. 1 and showing the testing chamber in one stage of its operation;

FIG. 5 is a partial vertical cross sectional view taken along the line 4—4 of FIG. 1 and showing the sample testing chamber in a second stage of operation;

FIG. 6 is a view similar to FIGS. 4 and 5 but showing the testing chamber mechanism in a third stage of operation;

FIG. 7 is a detail cross sectional view of the sample testing chamber;

FIG. 8 is a detail perspective view of a portion of the means for weighing a test sample, as shown in the lower right-hand portion of FIG. 3;

FIG. 9 is a detail perspective view of a portion of the spring arrangement employed in the weighing of a test sample;

FIG. 10 is a detail cross sectional view of still another portion of the spring arrangement shown in FIG. 3; and FIG. 11 is a detail cross sectional view of an air supply reservoir for the instrument.

Figure 1:
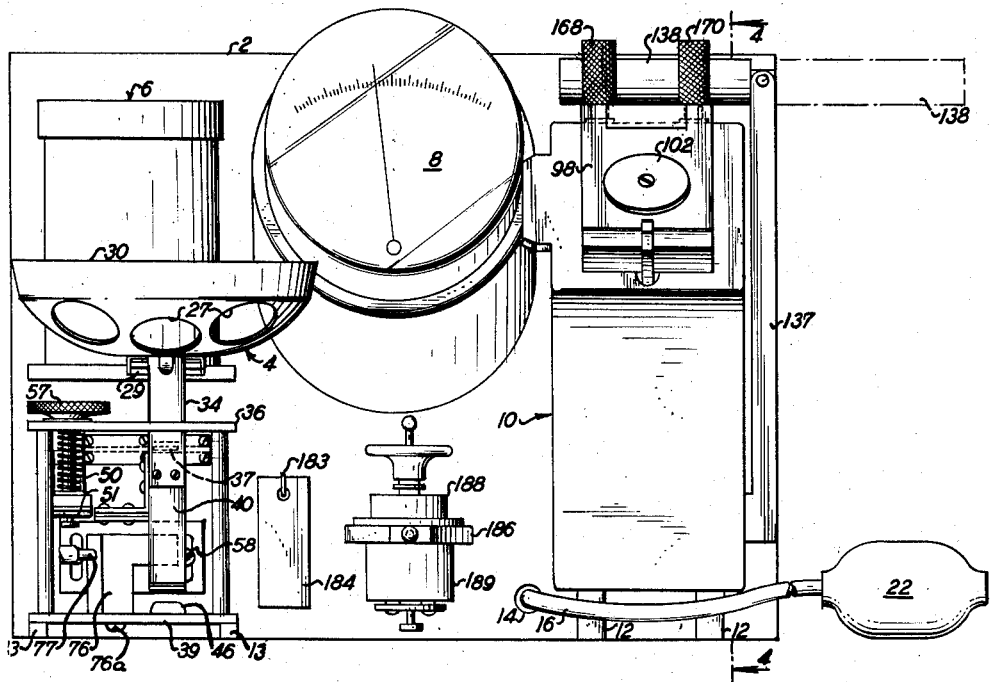
FIG. 1 is a front elevational view of an instrument embodying the principles of the present invention.
Figure 2:
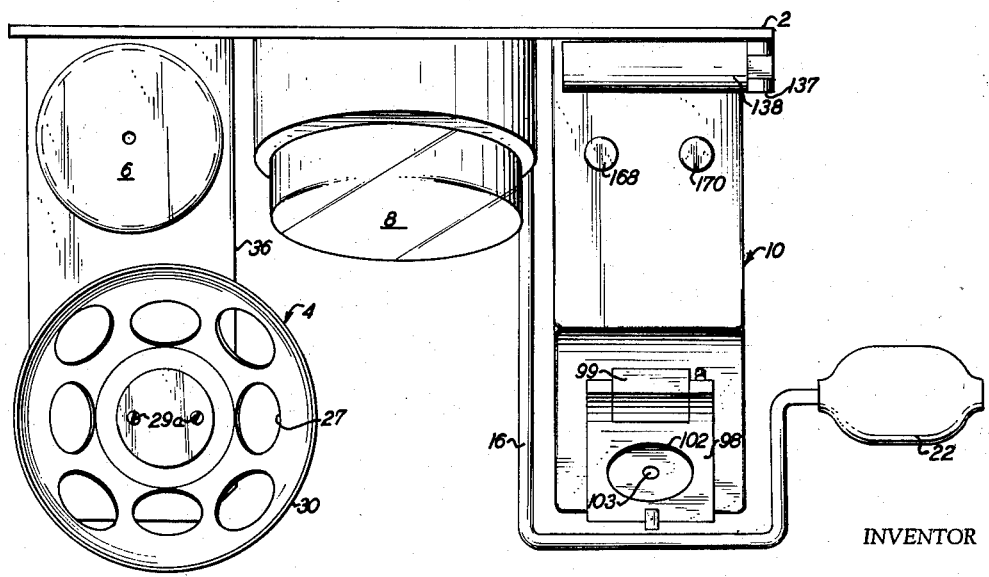
FIG. 2 is a top plan view of the instrument of FIG. 1.

Referring initially to FIGS. 1 and 2, the illustrated instrument includes a vertical support panel 2, to which the several elements of the apparatus are attached. The support panel 2 normally is fixed to an interior wall of a suitable casing, but the casing has been omitted from the drawings in the interest of simplicity.

Fixed to the front of the support panel 2 are a weighing mechanism generally indicated by the numeral 4, a pressure regulator 6, a meter 8 and a housing 10 for a group of elements which will be identified below. The housing 10 and the weighing mechanism 4 are provided with pairs of depending legs 12 and 13 for cooperating with the panel 2 to impart stability to the instrument when the instrument is disposed upon a horizontal surface.

In practice, a plurality of flexible air conduits extend along the rear face of the support panel 2, to connect the several elements of the instrument together. These conduits have been omitted from the drawings, however, in the interest of simplicity. The nature of the connections between the several elements will be apparent from the following description.

The front face of the support plate 2 also carries a fitting 14 (FIG. 1) for an air hose 16 which leads from the rear of the plate 2 to an atomizer bulb 22. The bulb is collapsible and is provided with check valves at its ends. When the bulb 22 is collapsed, air is ejected into tube 16, and when the bulb 22 is allowed to expand again, air is drawn into the opposite end of the bulb 22. If desired, a filtering device, not shown, may be inserted in the flexible tube at any convenient point. The construction of this bulb arrangement is so well known that no useful purpose would be served by further elaboration here.

The pressure regulator 6 is shown in detail in FIG. 11. It includes a vertical cylinder 23 having a free floating piston 24 disposed therein. The piston 24 may be constructed of a variety of metal, or other materials. However, it has been found that a graphite or carbon with binder composition gives the greatest serviceability and is more satisfactory from the standpoint of trouble free usage over long periods of time. In order to give sufficient weight to the piston 24, this element is advantageously made in the form of an inverted cup and the center portion thereof is provided with a lead core 26. The cylinder 23 is preferably formed of glass since this material is less subject to corrosion and distortion under normal operating conditions, and thus affords a dimensional stability not found where other materials are used. However, if desired a brass or other type material may be employed. The cylinder 23 is closed at its lower end by a tightly fitting cap 20 which is preferably formed of aluminum. The bottom cap 20 is provided with a rubber O-ring 21 to insure an airtight fit.

Air is forced into the cylinder 23 below the piston 24 through an opening 25 in the bottom cover and air is exhausted from the cylinder through another opening 25a, FIG. 11. Since the piston 24 is free, the exhaust pressure is substantially constant and is determined by the weight of the piston 24.

A removable cover member or lid 28 is positioned upon the top of the cylinder 23 to prevent the entrance of foreign matter into the cylinder and may be hinged to the support plate 2 for convenience. This cover is preferably formed of a clear acrylic plastic such as Plexiglas. If desired, the pressure of the air in the system may be regulated by opening the plastic cover 28 and inserting or removing weights from on top of the piston 24.

The weighing mechanism 4 includes a pan 30 upon which a sample of porous material or a standard weight may be supported during a weighing operation. As shown in FIGS. 1, 2 and 3, the pan 30 is of a general saucer-like configuration having a number of circular perforations 27 uniformly distributed therein. These perforations not only serve to decrease the weight of the pan and thus increase the sensitivity of the weighing, but also serve to diminish possible effects of air currents during the weighing operation.

As best shown in FIG. 3, the pan 30 is fixed to a hinge member 29 by means of screws 29a (FIG. 2). By this arrangement, the pan 30 may be tilted from its normal operating position, as shown by the solid lines in FIG. 3, to a storage position shown by the broken lines, for the purpose of making the instrument more compact and easily stored in its container.

The hinge member 29 contains a downwardly projecting ear 31 at one end and a spring type latch 32 of conventional construction at the other end thereof. The latch 32 is adapted to clip over a projection 33 on the vertical leg of inverted L-shaped support member 34. Thus when it is desired to tilt the pan 30 to place it in a position more suitable for storage, it is merely necessary to unclip latch 32 and tilt the pan 30 upwardly.

The support member 34 consists of a horizontal leg and a vertical leg, and is provided with a downwardly projecting hinge portion at the free end of its horizontal leg in position to mate with the ear 31 on member 29. The vertical leg of the support member 34, on the other hand, projects downwardly through an opening 35 (FIG. 8) in a plate member 36 and is fixedly attached at its lower end to a vertical leg 40 of a spring assembly.

As shown in FIG. 3, the spring assembly is composed basically of an upper horizontal leaf spring 37 and a similar lower, horizontal leaf spring 38. At their forward ends, the springs 37 and 38 are joined to opposite ends of a rigidly, vertical bar 40 which forms one side of the spring assembly. At their opposite ends, the springs 37 and 38 are adjustably connected to a rear plate 41 carried by the support panel 2. The plate 41 serves as the fourth side of the rectangular spring assembly. The springs 37 and 38 are clamped to the respective ends of the vertical bar 40 by means of small clamping plates 42 and 44 and suitable screws. In both instances, of course, the ends of the strip springs 37 and 38 may be easily removed from attachment with the vertical bar 40 by loosening the screws and clamping plates and then withdrawing the springs.

Due to its double spring suspension, the bar 40 is free to move vertically in either direction in response to the addition to or removal of weight from the pan 30. In order to prevent any possible damage to the delicate balancing mechanism in the event of excessive vertical movement of the bar 40, cushions 46 and 47 are provided on base plate 39 and plate 36 immediately below and above the respective ends of the bar 40.

The end of spring 37 opposite to that attached to vertical bar 40 is attached to an adjusting mechanism shown in greater detail in FIG. 9. This adjusting mechanism consists of a bar member 45 fixedly attached to the plate 41 by means of suitable screws. Also attached to the bar member 45 by means of screws is a downwardly projecting plate 43. The plate 43 contains an opening, conveniently of rectangular form, adapted to permit passage of the end portion of spring 37. The plate 43 preferably is formed of brass or other deformable material, and its lower half is bent forwardly away from the rear wall as shown in FIG. 9. Fixedly attached by means of screws 49 to the lower half of the plate 43 is a second bar member 48 parallel to and of a similar size to the bar 45 with the exception that it is a sufficient length to project a short distance beyond the end of the plate 43. Although the bar 48 is attached to the bent plate 43, it is not fastened to the rear plate 41 as is the case with the bar 45. Thus, the bar 48 may be moved slightly upon the application of a force large enough to distort the plate 43.

The spring 37 is arranged so that it passes through the opening in the bent plate 43 and is clamped to the upper surface of the bar member 48 by means of a clamping plate 56. At the extreme end of that portion of the bar 48 which extends beyond the bent plate 43, there is attached by means of screws, a heavy spring-like member 50. The spring-like member 50 extends forwardly and ends in an arched or semi-circular portion 53 adapted to fit about the upper half of a nylon member 51. A bolt 52 extends through a threaded hole in the member 51, passes loosely through a hole in the arched portion 53 of the spring-like member 50, proceeds upwardly through a flange sleeve member 54 encircled by a coil spring 55, passes loosely through the plate member 36 and is connected to a knurled knob 57.

By means of this arrangement, the linearity of the top spring 37 may be adjusted simply by turning the knob 57 an appropriate amount in one direction or the other. The turning of the knob 57 in one direction will act to raise the arched end 53 of the spring-like member 50. This raising of the arched end of the member 50 acts to apply a torque to the bar member 48 causing the top surface of the bar 48 to be twisted slightly in a counterclockwise direction, thus effectively raising that end of the spring 37. When the knob 57 is turned in the opposite direction, the coil spring 55 forces the arched end of the springlike element 50 downward, which in turn applies a clockwise torque to the bar member 48, acting to lower the spring 37.

The spring 38 may be adjusted in a somewhat similar manner by means shown in FIGS. 3 and 9. A plate 58 containing slots 59 and 60 is attached to the rear plate 41 by means of screws 61 and 62. The end of the spring 38 is fastened to the under surface of the plate 58 by means of a clamping bar 63 in the same manner as the spring 37 is attached to the bar 48. The screws 64 are positioned under the plate 58 and pass upwardly through the base plate 39, through coil springs 66, and into threaded holes in the plate 58. Only one screw 64 is shown in the drawings, but it will be obvious that two or more may be employed if desired.

Turning of the screw 64 in one direction causes the bar 58 to be pulled downwardly, further compressing the spring 66 and thus lowering the rear end of leaf spring 38. Turning of the screw 64 in the opposite direction, however, will cause the coil spring 66 to force the plate 58 upwardly, and thus act to raise the rear end of leaf spring 38.

The weighing mechanism contains a damping device which consists of a wire link member 65 firmly attached by a screw 67 (FIG. 8) to the side of vertical bar 40. A wire member 68 having a hooked end portion 69 is connected the link member 65 at its forward end and extends rearwardly into a horizontal chamber 70 attached to the rear plate 41. The chamber 70 is fashioned with a restricted neck-like opening 71 and contains therein a viscous liquid, such as a silicone, into which dips the hooked end of the wire member 68 to dampen vertical oscillating movements of the pan 30. The silicone should preferably have a viscosity in the range of 5,000 centipoises. This damping mechanism is particularly important in the weighing of cotton samples, for example, because the weighing must be carried out in such a manner as to give very accurate results.

As best shown in FIG. 8, there is attached to the side of the vertical bar 40 an L-shaped member having a vertical leg for connection to bar 40 and a horizontal leg 73 projecting horizontally from the bar 40. The leg 73 constitutes one member of a clamping device for holding an elongated horizontal arm 74. By means of suitable screws an upper clamp member is used to hold the arm 74 in any desired angular position. The arm 74 projects rearwardly toward the center of the spring assembly and is adjusted in such a manner as to be positioned in the path of an air jet issuing from a nozzle 75.

As shown in FIG. 8, the nozzle 75 extends upwardly from a block 76 mounted on the base 39 of the weighing mechanism for pivotal adjustment about the vertical axis of a securing screw 76a so as to vary the position of the nozzle 75. The screw 76a has been omitted in some of the views in the interest of clarity. An air inlet tube 77 is connected, by suitable air lines not shown, to a conduit 78 in the rear support plate 41, and thence to the air supply.

The weighing mechanism 4 is provided with a sheet metal cover of generally U-shape extending between the plates 36 and 39 from the back panel around the front end of the device so as to protect the various parts from dust and the like. This cover has been omitted from the drawings in order to illustrate clearly the internal construction of the mechanism.

It will be evident that upon the addition of a weight or sample to the pan 30, the vertical bar 40 will move downwardly, causing the under surface of the arm 74 to approach the nozzle 75. Obviously the amount of downward movement of the bar 40 is a measure of the weight disposed within the pan 30. The greater the weight, the greater will be the downward deflection of the bar 40 and of the arm 74. The present invention contemplates the measurement of the downward deflection of the bar 40 and the arm 74 by means of the resistance encountered by air flowing from the nozzle 75. The resistance to air flow through the nozzle is a function of the proximity of the arm 74 to the mouth of the nozzle. Thus as the arm 74 moves downwardly under the influence of a weight in the pan 30, the resistance of the nozzle 75 will increase. This change in resistance is utilized in the manner described below to obtain an indication of the weight in the pan 30.

One of the problems involved in weighing fluffy material, such as cotton fibers, is that the center of gravity of a given sample may be offset considerably from the center of the sample. The various adjustments which can be made in the weighing apparatus described above make it possible to condition the apparatus so that variations in the position of the center of gravity of the samples will not result in erroneous evaluations.

The side-to-side linearity of the system may be tested by obtaining weight readings with a standard weight suspended first from the right hand side of the weighing pan 30 and then from the left hand side of the weighing pan 30. These readings should substantially agree if the apparatus is calibrated properly. If they do not agree, the position of the jet 75 relative to the plate 74 may be adjusted so as to bring the readings into agreement. Such adjustment may be accomplished by rotating the block 76 about the vertical axis of its mounting screw 76a, or by shifting the plate 74 relative to the clamp by which it is attached to the vertical bar 40 of the device.

Front-to-back linearity also may be assured in the construction of this invention. If successive readings obtained with a standard weight suspended from the rear and the front of the weighing pan 30 should vary substantially, it usually will be desirable to adjust the suspension points for springs 37 and/or 38. For example, upward movement of the mounting block 58 for the lower spring 38 will cause the pan 30 to weigh lighter in the back.

FIGS. 4-7 illustrate the various elements disposed within the housing 10. The housing 10 is rigidly connected to the vertical support plate 2 and includes a base plate 90, a front wall 92, a top wall 94, and an oblique wall 95 connecting the top and front walls. Side walls on either side of the housing 10 are also provided but are not shown. The oblique wall 95 is provided with an opening of sufficient size to accommodate a cylindrical sample chamber 96. The chamber 96 is situated in such a manner that the greater portion of its length projects into the housing 10. The chamber 96 is firmly fastened to the oblique wall 95 by weld means, screw means, or other suitable means, and it may be provided with a shoulder on the outside surface to prevent it from slipping to the outside.

As indicated best in FIG. 7, the sample chamber 96 has a cylindrical bore and an air inlet tube 97 situated approximately one third of the distance from its lower end. That portion of the sample chamber which projects outwardly of the oblique wall 95 is provided with a cover 98 which is hinged to the wall 95 by means of a hinge 99 in such a fashion as to permit the raising of the cover 98 from the closed position shown by solid lines (FIG. 6) to the open position as illustrated by the broken lines. A spring member of conventional design, not shown, acts to urge the cover 98 toward the open position.

The under surface of the cover 98 is provided with a generally frusto-conical recess 100 adapted to be fitted loosely over the adjacent end of the sample chamber 96. The cover 98 is positioned in such a manner that, in its closed position, the inner surface of the recess 100 does not quite contact the end of the sample chamber 96, thus leaving a narrow space 101 between the two elements to permit the flow of air therethrough to the atmosphere. The cover 98 is also provided with a number of passages 93 through which air passing through the sample chamber 96 may escape. The holes 93 are preferably arranged in a generally uniform, concentric manner to insure a uniform flow of air. A circular resistance plate 102 is fastened to the cover 98 by screw means 103 and is separated from the cover by a washer 104, thus providing a means for controlling the resistance to the flow of air from the chamber 96 through the holes 93 in the cover 98.

Immediately below the oblique wall 95, the sample chamber 96 is provided with a tightly fitted collar 105 having a projection 106 on which is hinged a latch means 107. The latch means 107 projects downwardly along the side of the sample chamber 96 and is provided with a slanting surface 108 adapted to permit movement of the latch means without interference with the wall of the sample chamber, as shown in FIG. 6.

The latch means 107 also extends outwardly through a suitable opening in the oblique wall 95 and is provided with a hooked projection 111 at its outer extremity adapted to hook over the projection 109 in the cover 98. Thus, in its closed position, the cover plate 98 fits loosely over the end of the sample chamber 96 and is held in the closed position by the latch means 107. Upon movement of the lower end of the latch means 107 toward the sample chamber 96, as shown in FIG. 6, the hooked end 111 of the latch means 107 releases the cover 98 which in turn is moved to its open position, as shown by the broken lines in FIG. 6 by spring means situated at the hinge 99. If desired, a small coil spring 110 may be inserted in appropriate shallow holes in the latch means 107 and the wall of the sample chamber 96 to exert pressure against the latch means and thus prevent accidental release of cover plate 98.

The opposite end of the chamber 96 is fitted with a piston-like, adjustable closing means designated generally by the numeral 112 in FIG. 4, and shown in greater detail in FIG. 7. The adjustable closing means 112 consists basically of a frusto-conical plug element 114 having threaded portions at both ends for connection to auxiliary parts of the closing mechanism. The base of the frusto-conical plug element 114 is provided with a shoulder 113 and a threaded projection 115 which is screwed into a circular plate 116. A ring seal 117 of any suitable material is provide at the juncture of the closing plug and the plate 116 so that when the closing means is inserted into the end of the sample chamber 96, a tight seal will be effected, preventing possible air leakage through the rear of the sample chamber. The opposite end of the plug element is also fitted with a shoulder 118 and a threaded male projection 119.

The head of the closing means comprises a member 120 having perforations 121 uniformly distributed therein to permit passage of air therethrough. The member 120 also has a slightly frusto-conical configuration with the narrower diameter extending rearwardly and the larger end making a close fit with the walls of the sample chamber 96. The member 120 is provided with screw means 122 for fastening to an element 123 which acts to join the member 120 to the main body of the closing means. The element 123 consists of a plate member 124 having perforations 125 arranged circumferentially adjacent to a projecting ridge 126, which extends forwardly from the plate 124 a sufficient distance to allow for a narrow space 127 between the member 120 and the plate 124 when assembled. At its opposite side, the element 123 has a threaded projection of lesser diameter adapted to mate with the forward threaded portion 119 of the plug element 114.

The element 123 preferably is provided with a set screw 123a which may be interlocked with the end face of the plug 114 to prevent accidental movement between the plug 114 and the element 123. This screw 123a may be reached for manipulation through one of the openings 121 in the member 120.

Thus it may be seen that when the closing mechanism is inserted into the end of the sample chamber 96 to its fullest extent, it provides a cylindrical space 127 which is bounded by the walls of the cylindrical tube 96, the inner face of the recess in the cover plate 98 and the forward face of the member 120. This space will have a constant volume for each sample tested. However, where desired, the volume of the space may be adjusted by the simple expedient of advancing or retracting the threaded portion of the element 123 along the threaded portion of the plug element 114.

The test chamber closing mechanism 112 may be inserted into or retracted from the test chamber by means of an actuating arm 137 (FIG. 1) provided with handle 138, the operation of which acts to turn a shaft 140 in a clockwise or counterclockwise direction as desired. The shaft 140 extends laterally through the housing 10 and is journaled for rotation by any suitable means.

The full line position of the handle 138 in FIG. 1 is the storage position thereof, while the broken line position is that which facilitates manipulation of the lever 137.

Fixedly attached to the shaft 140 and movable therewith is an arm 143 to which is pivotally linked a rod 144 which is in turn pivotally linked to a plug element 114 by means of a pin 147 in a recess 146 (FIG. 7). Thus, movement of actuating lever 137 toward the rear support plate 2 acts to revolve shaft 140 in a clockwise direction and simultaneously, by means of the arm 143, acts to pull the closing mechanism 112 from the rear of the sample chamber 96. Similarly, movement of the actuating lever 137 toward the front of the testing device, operates to rotate the shaft 140 in a counterclockwise direction, thus inserting the closing means 112 firmly into the end of the test chamber.

Also present in the housing 10 and operated by shaft 140 is a linkage mechanism comprising an upright lever arm 128 pivotally mounted as at 129 to a vertical member 130 rigidly fixed to the front wall of the housing 10. Also pivoted to the vertical lever arm 128, at the point 131, is a horizontal linkage member 132. The opposite extremity of linkage arm 132 is formed into hook member 133 which is adapted to mate with a shoulder 141 on a cam 139 fixedly attached to the shaft 140.

Near the upper extremity of the upright linkage member 128, there is situated a short arm 134 projecting forwardly at such an angle as to contact a cushion member 135 when the linkage member 128 has been moved to its most forward position. The lower extremity of the vertical linkage arm 128 is flanged and perforated so as to provide means for connecting with a tension spring member 136, the other end of which hooks into a hole approximately midway along the length of the horizontal linkage arm 132 and serves to maintain this arm in position at all times.

The upper extremity of the linkage arm 128 is provided with a pin 156 or other element projecting horizontally and positioned in such a manner as to ride against the latch means 107 when the vertical linkage arm 128 is caused to move toward the rear of the housing 10 in conjunction with the movement of the actuating arm 137. This pin means 156 causes the latch means 107 to pivot in a counterclockwise fashion to disengage the hooked end 111 from projection 109 on the cover 98.

Thus it will be seen that the test chamber cover 98 may be opened automatically by the clockwise rotation of the shaft 140. When the shoulder 141 of the cam 139 mates with the hooked end 133 of the horizontal linkage member 132, further clockwise rotation of the shaft 140 and the cam 139 will pull the horizontal linkage 132 toward the rear of the housing 10. This in turn will cause the vertical linkage member 128 to pivot clockwise about the pin 129, causing the pin 156 to actuate the latch means 107 so that the cover 98 may swing open.

Connected to the shaft 140 is a projecting arm 142 which is in turn connected by the spring means 148 to a stud 149 projecting from the base plate 90 of the housing 10. The spring 148 will thus tend to resist counterclockwise rotation of the shaft 140 and the elements connected thereto.

Also situated within the housing 10 is an air switch structure which includes a cylindrical barrel 150, fixed rigidly in a horizontal position to stationary member 130. The barrel 150 is hollow and it carries a number of fittings 151 which connect its interior with flexible tubes, not shown, leading to and from the air switch. Attached to the air switch 150 by means of a fitting 151 is a balance reference resistor 190 which comprises a needle valve capable of fine adjustments for permitting a controlled flow of air to escape into the atmosphere, thus providing an adjustable resistance to the flow of air through the fluid circuit for purposes described more fully below.

Disposed within the barrel of the air switch 150 is an elongated valve element 152 operable horizontally and adapted to be moved forwardly and rearwardly by means 153 operated by an eccentric on the shaft 140. When the shaft 140 rotates, the eccentric causes the member 153 to move horizontally.

The sample test chamber described above simplifies the operations of inserting the sample into the chamber and extracting it therefrom. In the case of conventional test chambers having a fixed bottom and a cover, considerable difficulty is experienced in placing the sample uniformly in the chamber and closing the cover without having the springiness of the sample cause it to pop out as soon as it is released and before the cover can be put on. As a result, the sample must either be crammed tightly into the chamber or some sort of a plug must be inserted on top of the sample. In either case, difficulty is then experienced in removing the sample from the chamber after tests have been completed. Such means also make it difficult to distribute the sample uniformly within the chamber and to apply a uniform pressure throughout the sample.

By means of the novel sample chamber of this invention, however, these difficulties are alleviated or entirely removed. Thus, before the sample is inserted into the chamber, the closing mechanism 112 is retracted to its fullest extent leaving a chamber considerably larger than normal. The sample may then be inserted through the top of the chamber, loosely and uniformly. The top 98 is then closed without interference from the sample and the sample compressed to the desired volume from the bottom by moving the member 120 to its fully inserted position as shown in FIG. 5.

Removal of the sample after testing is also considerably more simple than with previous devices. When the cover 98 is released the sample is partially ejected from the chamber by its own resilience, permitting an easy grip on the sample and its quick, complete removal from the test chamber.

Referring again to FIG. 1, it is pointed out that the vertical support plate 2 is additionally provided with supports for certain standards used in calibrating and operating the instrument. A hook 183 removably supports a standard weight 184 which corresponds to the weight of the sample to be tested and a ring member 186 removably supports a member 188 of standard permeability.

The structure of this standard permeability member is similar to that fully disclosed in my copending application referred to above and no useful purpose is to be gained by further description at this point. Suffice it to say that the member 188 has a body portion 189 of such size that it may be inserted in an air tight fashion into the upper end of the sample chamber 96 when the cover 98 is in its open position. Air flows through the member 188 by means of restricted vertical passages to provide a standard resistance.

The first step in the operation of the apparatus of this invention involves a check weighing procedure. This is accomplished with the lever 137 in its raised position adjacent the rear support panel 2, and with the shaft 140 and the valve stem 152 of the air switch in the position shown in FIG. 4.

The standard weight 184 is placed in the weighing pan 30 and the atomizer bulb 22 is pumped a few times until the piston 24 reaches the top of the pressure regulator 23. The piston is then allowed to descend slowly, forcing air through the system. The flow of air from the regulator is divided into two paths which lead to different chambers in the air switch 150 in the manner described in my copending application, and from the air switch chambers the air passes to the atmosphere through separate paths. One of these paths includes a standard resistor, such as a regulatable needle valve 190 and the other path includes the nozzle 75 of the weighing mechanism.

The heavier the weight applied to pan 30, the greater will be the downward deflection of the member 74 to bring it closer to the nozzle 75. The closer this arm 74 is to the nozzle 75, the greater will be the resistance to the flow of air through the nozzle 75. In other words, the resistance of one of the paths leading from the switch 150 increases with increasing weight applied to the pan 30 and is therefore a measure of the weight in the pan 30. This measurement is evaluated by the meter 8 by comparing the resistance to flow through the nozzle with the standard resistance to flow established by the needle valve. The pressure differential will be reflected by movement of the needle of the meter 8 to some point along the scale, to indicate the degree of deflection of the arm 74 of the weighing mechanism.

Then the standard weight 184 is removed from the pan 30 and sample of cotton or other porous material is placed upon the pan. A few pumps of the atomizer bulb 22 will again condition the system so as to cause the meter 8 to reflect the amount of movement of the arm 74 of the weighing mechanism. If the new meter reading is the same as the reading obtained by use of the standard weight 184, the sample in the weighing pan 30 is of the correct weight. However, if the reading is different cotton may be added to or removed from the pan 30 to bring the reading into conformity with the reading obtained by the use of the standard weight 184.

It has been found that the check-weighing process just described can be simplified substantially by providing the scale of the meter 8 with a conspicuous mark representing the standard reading for the weighing operation. If the pointer deviates from this reading when the standard weight 184 is on the pan, it may be centered by suitable adjustments. One type of adjustment that may be carried out in order to move the pointer along the scale of the meter 8 is the adjustment of the upper spring 37 by manipulation of the knob 57. This changes the bias of the weighing mechanism somewhat and should affect the reading of the meter 8.

Another type of adjustment that may be employed if necessary is an adjustment in the air system itself. The bridge system employed for comparing the resistance to flow of air through the nozzle 75 with the resistance to flow of air through the standard resistor 190 includes variable restrictors which may be adjusted, in a manner well understood in the art, to vary the quantitative output of the sytsem. Valves 168 and 170 have been illustrated generally in the drawings, and it will be understood that valves of this type may be used to bring about adjustments in both the weighing system and the porosity system.

The porosity measuring system also is basically a bridge circuit which causes the meter 8 to indicate the difference between a reference resistance and the resistance offered by a sample of known mass and volume. Hence, calibration of the system is essential.

The standard 188 used for calibration is inserted into the sample chamber 96 and the actuating lever 137 is moved forwardly and downwardly so as to rotate the shaft 140 and cause the stem 152 to move forwardly in the air switch 150. As the valve stem 152 moves forwardly, the weighing system is disconnected and the porosity measuring system is connected into the active air flow paths. When the apparatus is in this condition, the bulb 22 is manipulated in the appropriate manner and a reading is obtained from the meter 8.

This reading should be a reading which corresponds to the known permeability of the standard 188. If it does not correspond, adjustments must be made so as to make it correspond. The needle valves 168 and 170 shown generally in the drawings are suitable for this purpose.

No attempt is made here to explain in detail the actual fluid paths in the weighing or the porosity measuring systems or to explain exactly the adjustments which may be required in order to calibrate the air systems. These features of the instrument are disclosed in my prior application Serial No. 661,224, filed May 23, 1957, and reference to such application may be had, if desired.

After the porosity measuring system has been calibrated, the instrument may be employed for actual porosity tests on cotton fibers. A sample which has been previously check-weighed, to assure that its mass is a standard quantity, is inserted into the chamber 96 at a time when the bottom closure mechanism 112 is in the position illustrated in FIG. 4 of the drawings. Care should be taken during this procedure to assure that the sample fills the chamber in a uniform manner.

The hinged cover 98 is then closed and locked in position by latch means 107. The compression lever 137 is then pulled forward until the closing mechanism 112 is fully inserted within the test chamber 96 and the seal 117 provides an airtight fit, thus compressing the fibers within the test chamber to a standard volume. By this means, the cotton sample is uniformly distributed throughout the test chamber. There are no areas of wadding and no free channels permitting the unrestricted flow or air through the chamber. Accordingly, a more accurate porosity value is obtainable than is the case with conventional devices where it is necessary to ram the sample into the top of the test chamber.

Manipulation of the atomizer bulb 22 then conditions the system so that a reading may be obtained on meter 8. Since the permeability of the sample determines the resistance to air flow offered by the sample chamber, the pressure differential indicated by the meter 8 is a function of the permeability of the sample, which in turn is an indication of the fineness of the fibers. Since the permeability test just described is carried out on a sample of known, standard weight and since the volume of the sample is constant, the meter may be calibrated to give direct fineness readings.

Although a specific embodiment of the invention has been described in detail, certain modifications and variations will be obvious to persons skilled in the art. Also, it will be apparent that fluids other than air may be utilized in the invention; that materials other than fibers may be tested; and that certain features of the invention have utility and advantages in combinations other than that specifically described herein. It is intended, therefore, that the foregoing description be considered exemplary only, and that the scope of the invention be ascertained from the following claims.

I claim:

1. In an apparatus for determining the fineness of textile fibers through the measurement of the resistance to the flow of fluids through a mass of said fibers, the improvement comprising a sample testing device having a sample chamber therein; fluid inlet means situated in the testing device but without the sample chamber; removable closure means at one end of the sample chamber; fluid outlet means including means within said closure for permitting the uniform flow of fluid from the chamber; means cooperating with said closure means for applying a predetermined resistance to the flow of fluid from the sample chamber; second closure means at the opposite end of said chamber including means cooperative with said closure effective to compress a fibrous sample within the chamber to a predetermined standard volume, and means for determining the resistance to the flow of air through said fibrous sample.

2. Apparatus for determining the resistance to fluid flow offered by porous material comprising a frame, a chamber for receiving a sample of the porous material, a fluid inlet in the wall of said chamber intermediate the ends thereof, a perforate closure cooperating with an end of said chamber through which the sample may be inserted and withdrawn, and an elongated plunger extending into the opposite end of said chamber and being movable between a fully inserted position and a retracted position, said plunger including a perforate head at the inner end thereof and a fluid seal at the outer end thereof adapted to cooperate with the end of the chamber when the plunger is in its fully inserted position, said plunger being of such length that the head thereof is located between said fluid inlet and said perforate closure when the plunger is in its fully inserted position.

3. Apparatus for determining the resistance to fluid flow offered by porous material comprising a frame, a chamber for receiving a sample of the porous material, a fluid inlet in the wall of said chamber intermediate the ends thereof, a perforate closure cooperating with an end of said chamber through which the sample may be inserted and withdrawn, an elongated plunger extending into the opposite end of said chamber and being movable between a fully inserted position and a retracted position, said plunger including a body having a fluid seal carried by the outer end thereof and having a perforate head mounted on the inner end thereof by adjustable means for permitting lengthwise adjustment of the position of said head relative to said body, said seal being adapted to cooperate with the end of the chamber when the plunger is in its fully inserted position and said perforate head being intermediate the fluid inlet and the perforate closure when the plunger is fully inserted for admitting fluid to the zone of the chamber occupied by the sample, adjustment of said head relative to said body serving to adjust the volume of said test chamber, and means connected to said body for moving said body through a fixed distance upon operation of said means to assure proper coaction between said seal and the adjacent end of said chamber.

4. Apparatus for determining the resistance offered to fluid flow by porous material comprising a frame, an open-ended chamber on said frame for receiving a sample of the porous material, a fluid inlet for said chamber, a valve operable to direct fluid to said inlet, a movable closure cooperating with an end of said chamber through which the sample may be inserted and withdrawn, spring means biassing said closure to the open position thereof, latch means for holding said closure in the closed position thereof, a plunger extending into the opposite end of said chamber, a shaft rotatably mounted on said frame, manual means for rotating said shaft, a crank fixed to said shaft, and a link pivotally connected to said crank and to said plunger from moving said plunger upon rotation of said shaft, means operatively connecting said shaft and said latch means to release said latch means when the shaft begins to move in a direction tending to withdraw said plunger from said chamber, and means operatively connecting said shaft and said valve for operating said valve upon rotation of said shaft.

5. Air flow fineness testing apparatus for textile fibers comprising a frame, a chamber for receiving a sample of the textile fibers, an air inlet in the wall of said chamber intermediate the ends thereof, means for supplying air at a pressure above atmospheric to said inlet, a perforate closure cooperating with an end of said chamber through which the sample may be inserted and withdrawn, and an elongated plunger extending into the opposite end of said chamber and being movable between a fully inserted position and a retracted position, said plunger including a perforate head at the inner end thereof and an air seal at the outer end thereof adapted to cooperate with the end of the chamber when the plunger is in its fully inserted position, said plunger being of such length that the head thereof is located between said air inlet and said perforate closure when the plunger is in its fully inserted position.

6. Apparatus for determining the resistance to fluid flow offered by porous material comprising a frame, a chamber for receiving a sample of the porous material, a closure cooperating with an end of said chamber through which the sample may be inserted and withdrawn, an elongated plunger extending into the opposite end of said chamber and being movable between a fully inserted position and a retracted position, said plunger including a body and a head threadedly connected to the inner end of said body so that the length of said plunger may be adjusted by rotating said head relative to said body, and means connected to said body for moving said body through a fixed distance upon operation of said means.

References Cited in the file of this patent
UNITED STATES PATENTS

| | | |
|---|---|---|
| 2,739,806 | Stelzer | Mar. 27, 1956 |
| 2,784,958 | Byrkett | Mar. 12, 1957 |
| 2,880,609 | Byrkett et al. | Apr. 7, 1959 |
| 2,888,823 | Hertel | June 2, 1959 |
| 2,919,573 | Berkley | Jan. 5, 1960 |